United States Patent [19]

Sang, Jr. et al.

[11] Patent Number: 5,317,646

[45] Date of Patent: May 31, 1994

[54] AUTOMATED METHOD FOR CREATING TEMPLATES IN A FORMS RECOGNITION AND PROCESSING SYSTEM

[75] Inventors: Henry W. Sang, Jr., Cupertino; Whei-Tsu H. Tahn, Sunnyvale; Xiao B. Zhang, Foster City, all of Calif.

[73] Assignee: Xerox Corporation, Stamford, Conn.

[21] Appl. No.: 856,434

[22] Filed: Mar. 24, 1992

[51] Int. Cl.⁵ .......................... G06K 9/34; G06K 9/64; G06K 9/68; G06K 9/20

[52] U.S. Cl. ......................................... 382/9; 382/33; 382/61; 395/149

[58] Field of Search ................... 382/61, 33, 9, 22, 48, 382/63; 395/148, 149

[56] References Cited

U.S. PATENT DOCUMENTS

| | | | |
|---|---|---|---|
| 4,933,979 | 6/1990 | Suzuki et al. | 382/61 |
| 5,014,331 | 5/1991 | Kurogane et al. | 382/48 |
| 5,038,383 | 8/1991 | Usumoto et al. | 382/16 |
| 5,058,189 | 10/1991 | Kanno | 382/61 |
| 5,140,650 | 8/1992 | Casey et al. | 382/61 |
| 5,159,187 | 10/1992 | Okisu et al. | 250/208.1 |

OTHER PUBLICATIONS

Strong, H. R., "Method For Mask Generation Suitable For Use In Scanning Preselected Areas of Standard Documents", IBM Tech Discl. Bulletin vol. 20, No. 1, Jun. 1977.

IBM Systems Journal vol. 29, No. 3, 1990; pp. 435-450, titled "Intelligent Forms Processing".

Primary Examiner—David K. Moore
Assistant Examiner—Michael Cammarata
Attorney, Agent, or Firm—Lisa M. Yamonaco

[57] ABSTRACT

A forms recognition system having a method which assists an operator in creating an electronic template. The automated method would allow an operator to view an electronic bitmap of a master or blank form on a graphical display, the master form having bounded or semi-bounded regions depicting fields. An operator would display the bitmap, select a single point within a bounded or semi-bounded region on the bitmap with a pointing device, and the coordinates representing the bounded region would be automatically determined using the single point selected by the operator.

18 Claims, 10 Drawing Sheets

AUTOMATED METHOD FOR CREATING TEMPLATES IN A FORMS RECOGNITION AND PROCESSING SYSTEM

This application is cross-referenced to related application Ser. No. 08/098,220, which is a continuation of Ser. No. 07/841,689, now abandoned, to Sang et al., filed Feb. 26, 1992, titled "Forms Recognition and Processing System" which is hereby incorporated by reference.

BACKGROUND OF THE INVENTION

This invention relates to a forms recognition system, and more particularly to an automated method for assisting creation of templates from blank masters in a forms recognition system.

Often in forms recognition systems, a template is made from the bitmap of a master form, the master being a blank copy of a form. This template has designated areas or fields in which data will be added by a user, and eventually extracted, for storage into a database by the recognition system. Once this template is defined, the recognition system uses this template to process an incoming completed form having the same layout as the template.

Typically, the creation of the template is a manual task which requires time and fine motor skills on the part of the creator. A master form is scanned in and the bitmap, or a reduced resolution version of the bitmap, is displayed on a graphics display of a graphical workstation. The creator of the template then designates on the displayed bitmap the positioning of areas which will contain data to be extracted. These areas are often referred to as fields. These fields may be outlined or framed, for example by a rectangular box, and may also contain text asking a question. It can be appreciated that many different ways of indicating fields on a form can be envisioned.

There arises difficulties when using a computer graphics interface to designate certain graphical objects, like a box around a field, when the object is to be selected from a bitmap. Usually, it is necessary to manually define the object or region using a pointing device such as a mouse. The operator may use the pointing device to select a corner of the object or region and draw along the boundary of the object, being careful not to include extraneous parts of the overall object, and yet including enough of the bitmap to specify the entire field of the form. Fine motor coordination on the part of the operator is necessary for successful definition of the object. Furthermore, for each template created, the operator would have to perform such a function many times. It is not uncommon for a form to have 100 separate fields which would have to be designated.

The operation of designating fields may be further complicated when the image processing used in the recognition system requires additional regional definitions. For example, the system may need both the area inside a rectangle, designating a field, as well as a buffer around that rectangle to account for text which flows out of the boundaries of that rectangle. Furthermore, when working with a high resolution bitmap, it may be impossible for a human using a pointing device to designate the exact coordinate position of an area depicting a field on a graphical display. Therefore, an automated method which assists the operator in creating a template would be highly useful.

One approach for using a computer system for extracting data from a form is set forth in an article by R. G. Casey and D. R. Ferguson in the IBM Systems Journal Vol. 29, No. 3, 1990 Pages 435-450 titled "Intelligent Forms Processing." Disclosed is a forms recognition process whereby the forms are scanned creating an electronic bitmap representation of the image. Using various image processing techniques, the bitmap form is analyzed and compared with other bitmap forms, stored in a database as templates, until a match is found. If no match is found, the user must enter the new type of form by interacting with the computer and specifying a new addition to the template database. The template creation process includes displaying the bitmap on a graphical display and using a pointing device to designate the outlines of fields. No automated method to assist the operator in creating the templates is disclosed.

Similar to the article by Casey and Ferguson, U.S. Pat. No. 4,933,979 to Suzuki et al. discloses a form sheet reading apparatus. In this system, a form is scanned resulting in an electronic bitmap which is displayed for a user on a graphic display terminal. The user, using a graphical input interface, then selects on the displayed bitmap the items which make up the template. For instance, the user may outline a box which has information answering a question posed on the form. The designations of the user are stored into a first file and is later used as a template. However, the process of template creation disclosed in Suzuki et al. is very manual intensive and prone to error. Also, Suzuki et al. requires that there be at least one line on the form in order to detect a field thus, eliminating the possibility of recognizing forms which do not have lines designating the fields. Again, no automated method of assisting the operator in creating the template is disclosed.

U.S. Pat. No. 5,014,331 to Kurogane et al. discloses a method of determining an internal point within a closed area on a bitmapped image. The operator draws a free form continuous circumference of a closed area using a pointing device. From this drawing, a rectangular region is determined and thus, a point within the determined rectangular region is calculated. Even though Kurogane et al. set forth a method to find a rectangular region, it does not address the problem of finding the exact boundary of a rectangular region already on the bitmap.

As can be appreciated, designating the exact position of an object or field on a bitmap is difficult, time consuming, and maybe even impossible using the methods disclosed above. Therefore, an easier, faster and more precise method of creating a template from a bitmap is warranted. This process would contain automation which would assist the operator in creating new templates from a bitmap reducing the problems of template creation discussed above.

SUMMARY OF THE INVENTION

In accordance with the present invention, disclosed is a method for assisting creation an electronic template in a forms recognition system, the forms recognition system having a graphical display and a pointing device, including the steps of: scanning a blank master creating a master bitmap, the blank master having regions indicating fields; displaying the master bitmap on the graphical display; selecting a point within a first region with the pointing device; expanding automatically about the point to determine coordinates of a region which conforms to, or approximates the first region; repeating the above steps for each of the regions on the master; and storing the coordinate information of the regions which conforms to, or approximates the first region, to be used in assisting creation of the electronic template.

This approach would allow the operator to maintain a higher state of concentration on the total task of mapping bitmap regions of a form onto the target template. This approach is meant to assists the operator and would not restrict the user from further editing. Also, the operator would have an easy to use interface which is based on a series of singular pointing operations without having to use fine motor skills which would result in faster template creating. Finally, this method would allow for the use of a lower resolution graphic workstation display, hence reducing the cost of the system, since the user would not have to view all pixels, yet the coordinates defining a region would be at full resolution.

BRIEF DESCRIPTION OF THE DRAWINGS

In the drawings:

FIGS. 6a–6t depict a methodology for finding the maximum rectangle within a bounded region given a seed starting point.

DETAILED DESCRIPTION OF THE INVENTION

Exemplary Hardware Configuration

Figure 1:
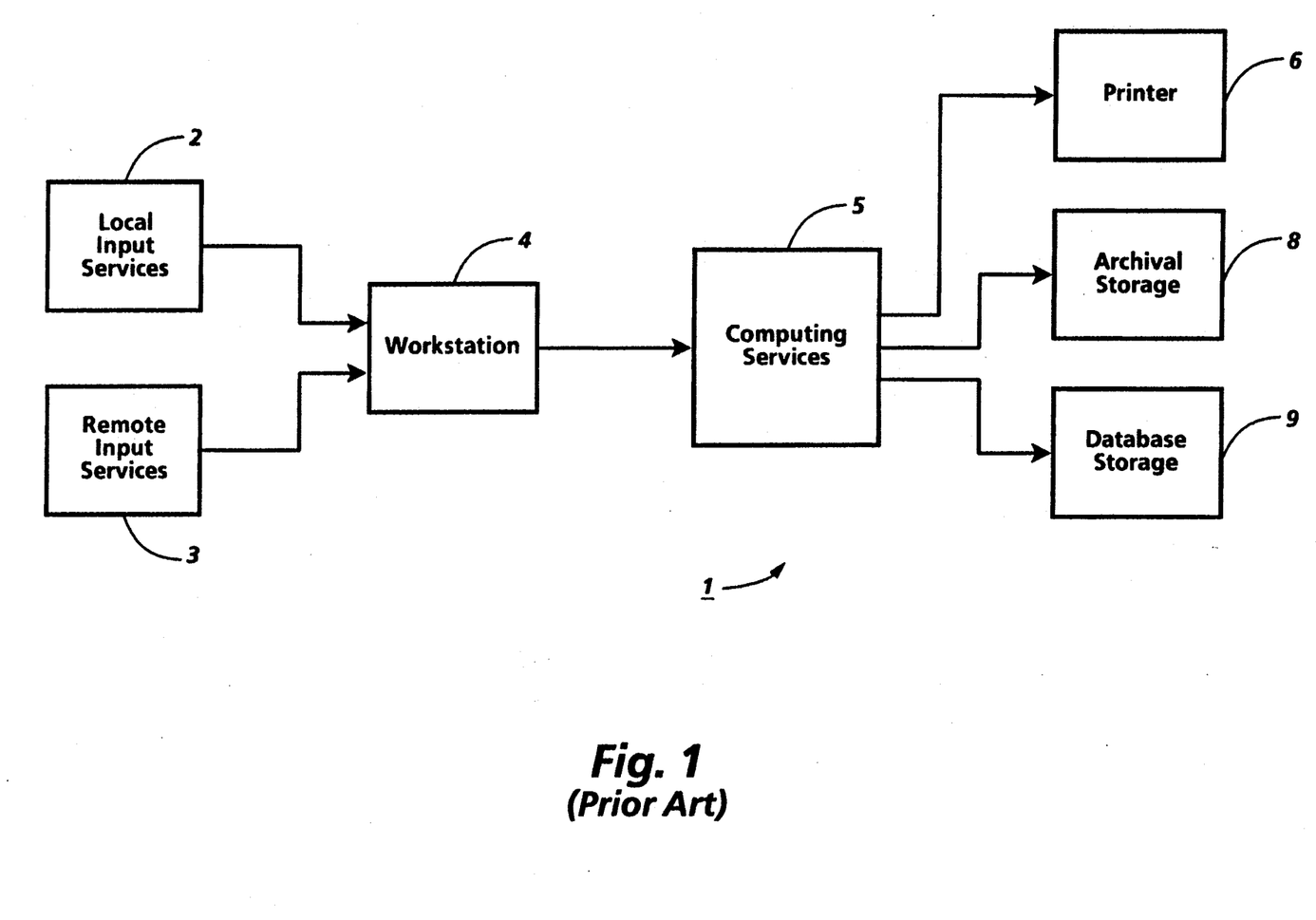
FIG. 1 is a diagram showing the configuration of a typical hardware system configuration incorporating the present invention.

Referring to FIG. 1, shown is a typical hardware system configuration utilizing the present invention. System 1 comprises a Local Input Service 2 for providing a document and creating a digital electronic representation of that document in the form of a bitmap. Also for creating a bitmap image, shown is a Remote Input Service 3 which can be in the form of a fax machine for digitizing an image and sending the digital representation of that image to remote locations using a telephone line or equivalent. Or, Remote Input Service 3 can get information from another computer which describes a form in a Page Description Language (PDL) and hence transforms the PDL into a usable bitmap. Bitmaps created by Local Input Services 2 and Remote Input Services 3 are received by workstation 4. Workstation 4 allows an operator to view the bitmap and do various other administrative functions with the bitmap such as editing, template creation, and filing. Workstation 4 is attached to computing services 5 which performs processing functions on the bitmap as will become apparent. Also, computing service 5 acts as distributor for distributing information, including the bitmap, to other functional units in system 1 like printer 6, database storage unit 9 and archival storage unit 8. System 1 above is an example of one possible hardware system configuration and is not meant to be limited to the components shown in FIG. 1.

Forms Recognition System Introduction

Figure 2:
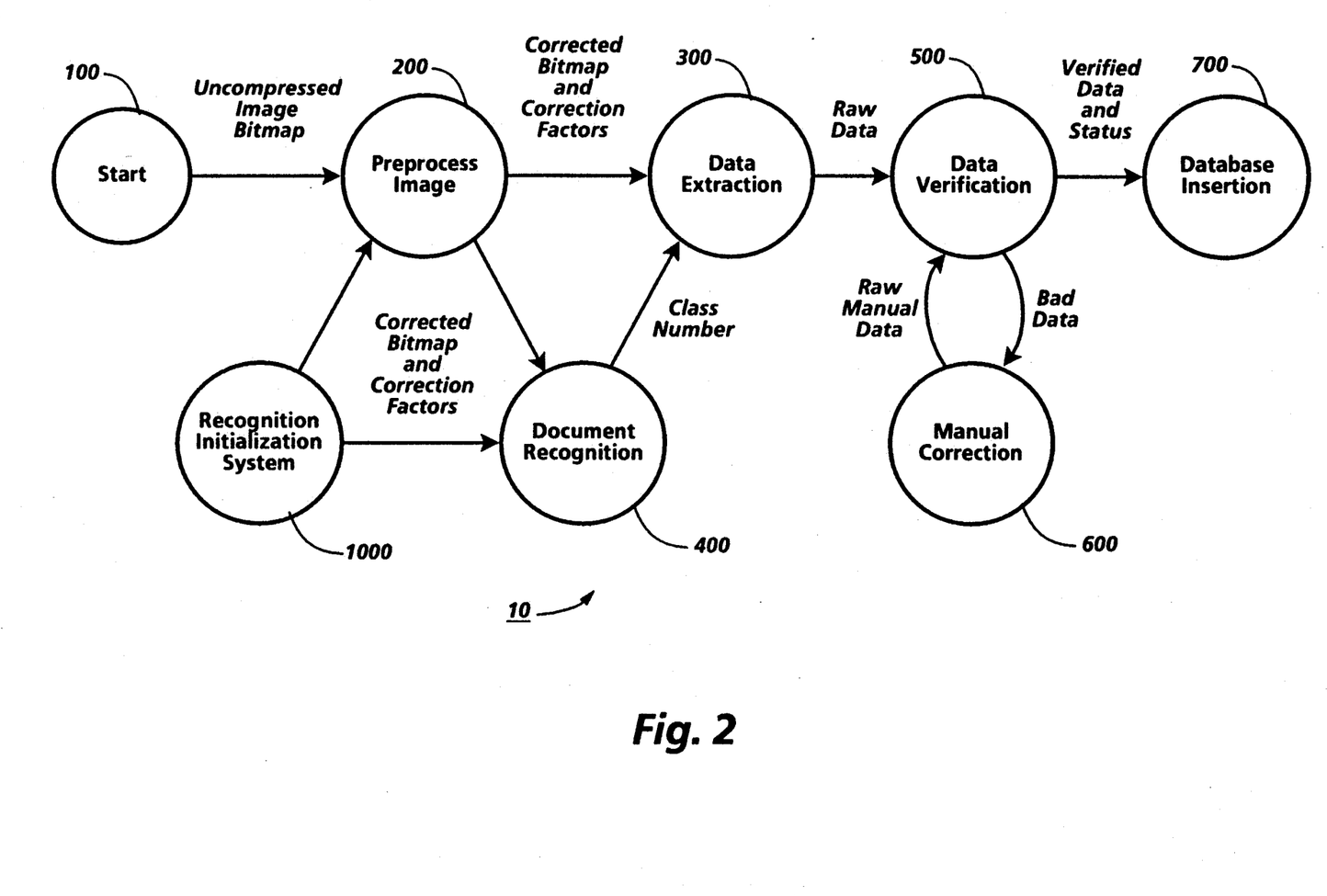
FIG. 2 is a top level flow diagram of the Forms Recognition System depicting the major subsystems incorporating the present invention.

Referring now to FIG. 2, shown is an overview of Forms Recognition System 10. Each subsystem block shown in FIG. 2 is explained in detail within cross-referenced application titled "Forms Recognition and Processing System." Sections of Forms Recognition System necessary for understanding the present invention will be described below.

As an overview to system 10, at Start Block 100, a compressed bitmap image, coming from a digitizing source, like Local Input Services 2 or Remote Input Services 3 of FIG. 1, is decompressed and fed to Preprocessing Block 200. The bitmap image also contains information as to which external input device it came from encoded therein. Preprocessing Block 200 performs image manipulations, like skew correction and resolution conversion, and prepares the bitmap for processing by Data Extraction Block 300 and Document Recognition Block 400. Document Recognition Block 400 determines which form, stored as a template, matches that of the scanned bitmap and sends a class number or prioritized list of class numbers pertaining to that template to Data Extraction Block 300. The class number identifies which form is being used, identifies a template of that form, and which areas on the bitmap to find each field on the template in order to extract data, along with the type of recognition system needed to process the extracted data. For example the template would tell where to look for a field of text and to apply text recognition on the text data in that field. Using this class number, Data Extraction Block 300 is able to extract information from the bitmap and render several smaller bitmaps, and/or actual data, for later storage into a database.

Data Verification Block 500 determines if the information extracted from the several smaller bitmaps is valid. If not, the data is sent to Manual Correction Block 600 for further inspection by an operator. If the data extracted from the bitmap is complete and accurate, it is sent to Database Insertion Block 700 for storage into the database. If the bitmap having a form format which is new to the system needs to be entered into the system, special processing to add a template for this new form must be performed to enable recognition and data extraction of its fields. This takes place during the learning mode. In this case, Recognition Initialization System Block 1000 performs the functions necessary to add or delete templates in the system later allowing for automatic recognition and data extraction during runtime operation. Furthermore, Recognition Initialization Block 1000 derives the Random Model Parameters and Systematic Model Correction Factors to be used throughout system 10.

Recognition Initialization Subsystem

Figure 3:
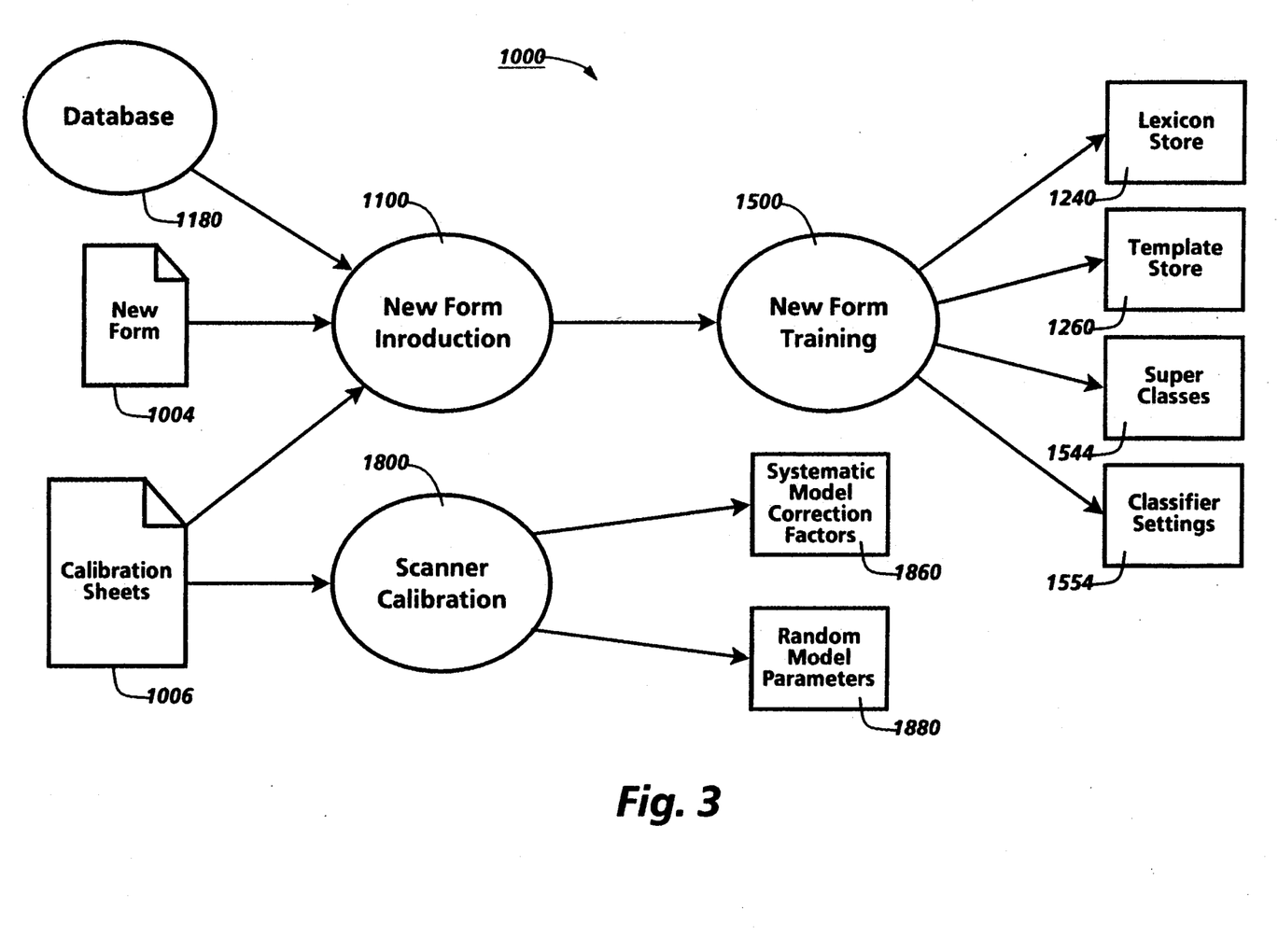
FIG. 3 is a flow diagram of the Recognition Initialization Subsystem.

Referring to FIG. 3, shown is a flow diagram of Recognition Initialization System 1000. Recognition Initialization System 1000 consists of three parts, New Form Introduction Block 1100, New Form Training Block 1500, and Scanner Calibration Block 1800. The function of Recognition Initialization System 1000 is to add new templates for form recognition to system 10 using a robust and automated method. The implementation of the Recognition Initialization System 1000 is also referred to as the learning mode of the system. In general, to enable learning, an operator scans in new blank forms, or masters, creating bitmaps of those masters.

Feature extraction, attribute creation, and classification on the bitmaps are performed as well as training of a classifier to be used during run-time operation. Calibration on machines used to create the masters is run to determine systematic errors and included in the learning process. Once complete, representations of the masters with associated classification numbers and other useful information are added to a Template Store as templates.

In general, New Form Introduction block 1100 takes input from Database Information Block 1180, New Form Bitmap 1004 and Calibration Sheets 1006 to get the bitmaps representing a master to be added to system 10 ready for New Form Training Block 1500. Scanner Calibration Block 1800 uses information from Calibration Sheet 1006 and produces Systematic Model Correction Factors 1860 and Random Model Parameters 1880. New Form Training Block 1500 will output Lexicon Store 1240, Template Store 1260, Superclasses 1544 and Classifier Settings 1554. Scanner Calibration System 1800 will output Systematic Model Correction Factors 1860 for the scanners and printers as well as the Random Model Parameters 1880 that will be used in training the classifier.

New Form Introduction Subsystem

Figure 4:
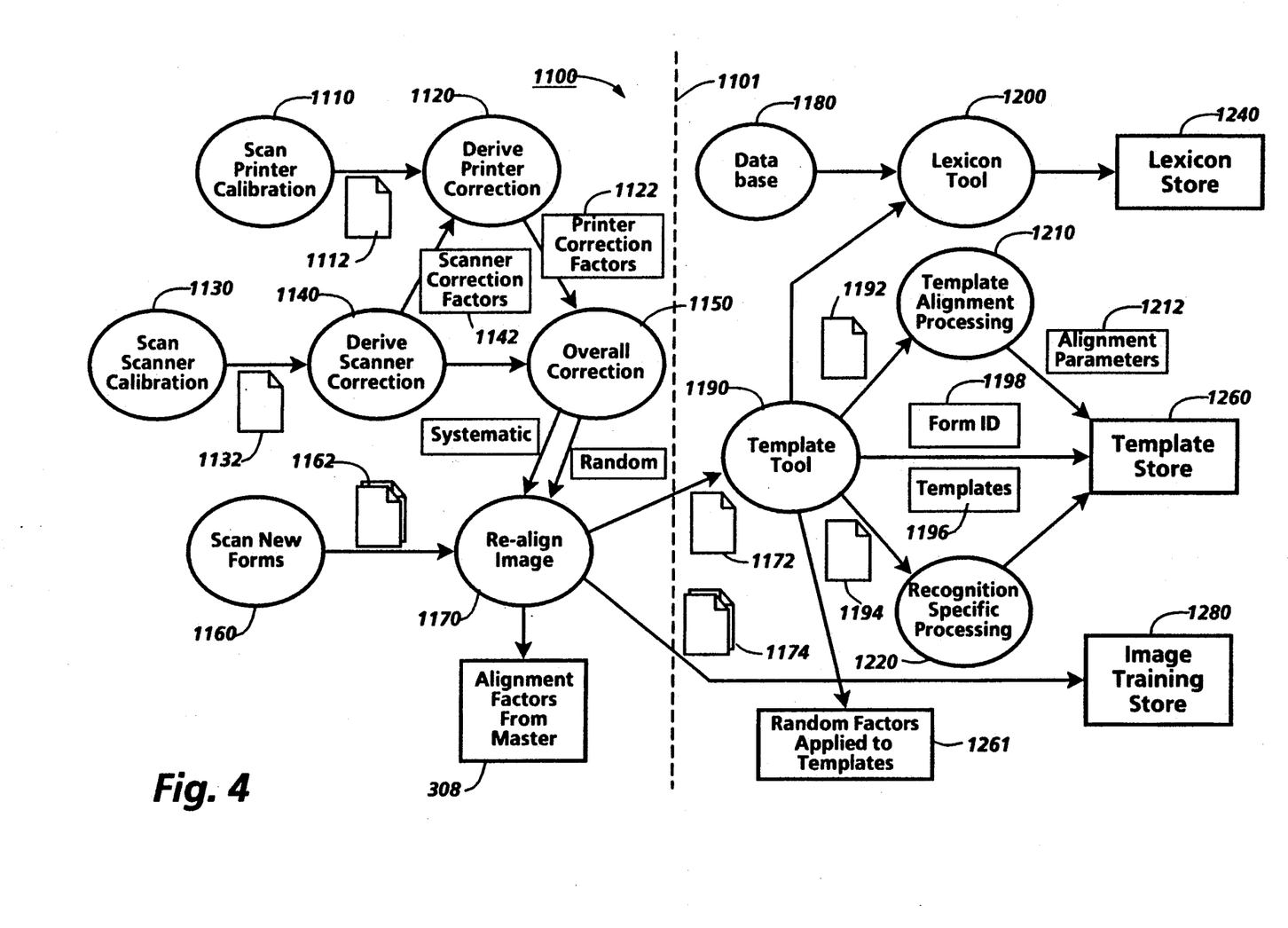
FIG. 4 is a flow diagram of the New Form Introduction Subsystem.

Referring now to FIG. 4, shown is a detailed flow diagram of New Form Introduction Block 1100. The purpose of New Form Introduction Block 1100 is to add a new form, or master (i.e. blank form), in the form of a template to system 10. A master is a new form which does not have its fields filled in with data but contains all of the structure (e.g. lines, boxes, etc.) and fields. As will be shown, a template is created from the master. A template is used to help recognize forms and extract information from those forms during run-time operation. The template contains information concerning coordinates designating certain fields on the master, which recognition system to be used in identifying the information within each field, and attribute information. Line 1101 designates a separation in the functionality of Block 1100. Functions to the left of line 1101 are for correcting a bitmap of a master about to be stored in system 10. Functions to the right of line 1101 are operations performed once the incoming bitmap has been corrected.

With the printout of a master, printer calibration sheets are also printed. Information derived from the printer calibration sheet will go into a set of routines which compensate for the systematic printer errors. Printer calibration is done by Scan Printer Calibration Block 1110 producing bitmap 1112. Bitmap 1112, which represents the calibration sheet, is then channeled to Derive Printer Correction Block 1120 where printer correction factors are determined. In a similar manner, scanner calibration is accomplished by Scan Scanner Calibration Block 1130 which produces bitmap 1132 representing an electronic version of the calibration sheet. Bitmap 1132 is created and passed on to Derive Scanner Correction Block 1140 where Systematic and Random Scanner Correction Factors 1142 are derived.

The calibration will typically be done with more than one calibration sheet. Several sheets may be needed for big printers using belt systems because different places on the belt may have different results. Therefore, it is a good idea to do multiple printouts and to scan multiple times (e.g. five) which will help develop master specific systematic and random calibration distortion models. The process would be to print out calibration sheets, preferably more than one sheet, calibrate the scanner, scan the printer calibration sheets, derive the printer correction based on the scanner correction and then derive an overall correction factor which has both the systematic and random parts. These random parameters help to derive what goes into the Template Store 1260. Note there are actually two different sets of random parameters in the system. Master specific systematic and random distortion calibration models, coming from Overall Correction Block 1150 differ from system models in that the calibration specific models are determined by calibration only whereas the system model take many other factors into consideration. The random calibration parameters are derived from the random correction factors of the scanner and printer calibration and from the use of multiple master copies of the printout that is used in the scanning. This gives a unique highly tuned random calibration parameters for the Template Tool 1190 specific to that set of masters as calibrated. These parameters would change on a daily basis. It should also be noted that masters described by a PDL or some other process used to create a bitmap from a page description can be used. In this case, calibration would not be needed.

Overall Correction Block 1150 combines both scanner and printer correction factors yielding a set of correction factors, systematic distortion calibration models and random distortion calibration models, to be used by Realign Image Block 1170. Knowing Scanner Corrections Factors 1142 and Printer Correction Factors 1122, one can scan in the new master several times using Scan New Forms Block 1160, take the resulting bitmaps 1162, and realign the image on bitmaps 1162 using Realign Image Block 1170 according to those predetermined systematic calibration factors for that day. Also, the process of creating this near ideal master image Realign Image Block 1170 yields Alignment Factors From Master 308 to be used in the run-time operation. Furthermore, Realign Image Block 1170 passes along random distortion calibration parameters, to account for the range or distribution of random correction factors found in the calibration system, to Template Tool 1190.

The realigned master, now in the form of bitmap 1172, is passed along to Template Tool 1190 along with the random distortion calibration parameters. Template Tool 1190 is for setting up a template from the master to be used in the recognition and data extraction sections of system 10. Template Tool is run manually by an operator who can display the bitmap of the master on a graphic workstation like that of workstation 4 in FIG. 1. The operator can then designate on the screen of a graphic workstation where certain fields reside on the bitmap along with the type of recognition system used to process the information in the fields.

Template Creation Process

In accordance with the present invention, Template Tool 1190 takes advantage of image processing on the bitmap image to assist the operator in region selection and definition. The operator would select one point, or bounded region within the interior of a region of interest, usually containing a boundary, with a pointing device such as a mouse. Then, the image processing system would use this point or bounded region as a seed from which to find the region of interest. This system would further need to account for the variations in region designation typically found on forms such as circles, boxes, underscores, etc. The operator would choose a mode or object definition, for example, box mode, to provide constraints to the image processing for regional identification. The system would expand the seed to conform, to approximate, or to identify a maximum regular region identifiable within any type of closed or even special unclosed or unbounded object.

There are many different methods for performing the image processing needed for this task. One such method would make use of the creation of a higher order run-length based data structure based on line adjacency graphs. Given a seed, the data structures could be traversed to determine bounding regions. Another approach would use binary morphological based image processing to expand the seed for clipping the expanded image against the original bitmap.

Another variation to assist in template creation process would be to have the image processing procedure precede the template creation process. In such a system, the image processing system would attempt to identify closed regions and lines. It could then use this information as a seed to try to expand and find the regions of interest. In which case, the operator could then simply edit the processed "best guesses" which may be highly accurate. During the edit process, the same capabilities would be present as disclosed above but there would already be some object definitions. Such a facility is envisioned to greatly reduce the amount of tedious work required to make a template having many fields.

Figure 5:
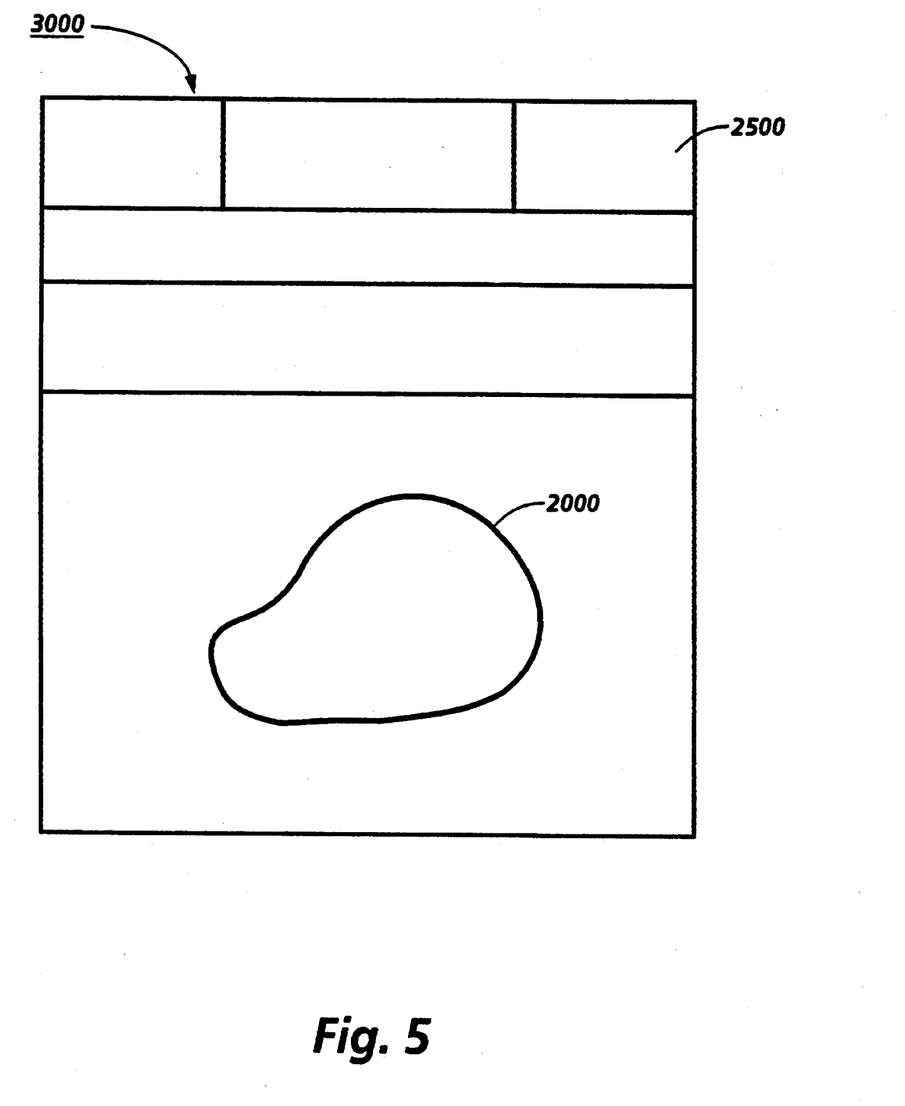
FIG. 5 depicts a bitmap form showing regions used as fields.

Referring to FIG. 5, shown is a bitmap form 3000 which would be displayed on a graphical user interface for editing by an operator. Bitmap 3000 has region 2000 which will be discussed below as an illustration for the present invention. Although operations on region 2000 are explained in detail, the operations could be performed on any type of region (e.g. region 2500) on bitmap 3000.

Figure 6A:
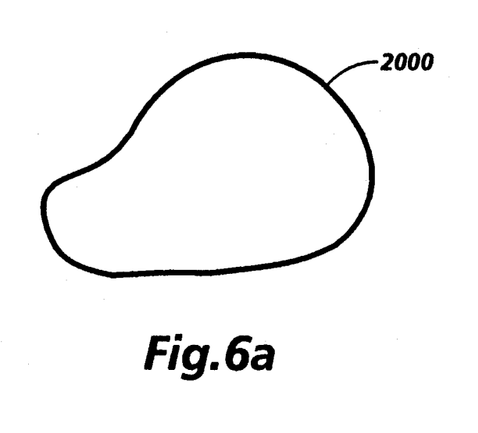
Figure 6B:
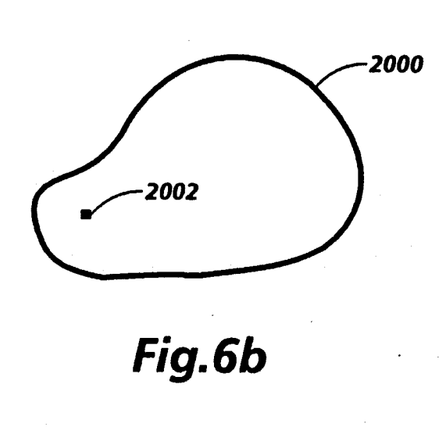
Figure 6C:
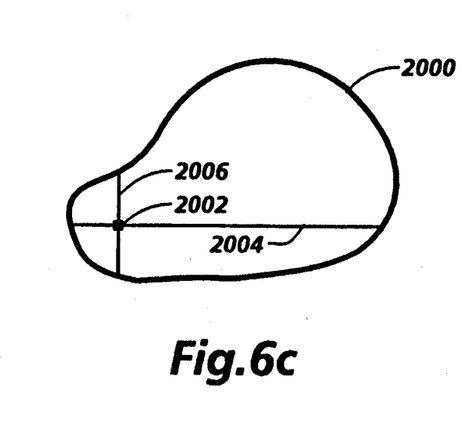
Figure 6D:
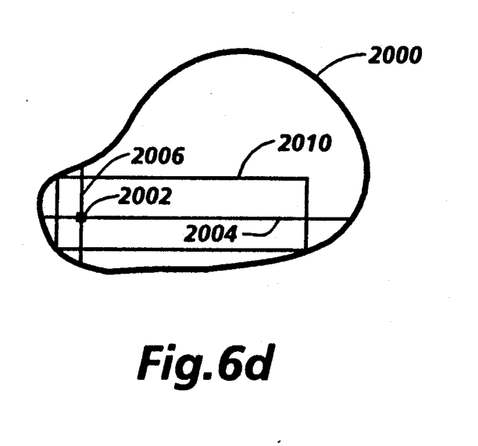
Figure 6D:
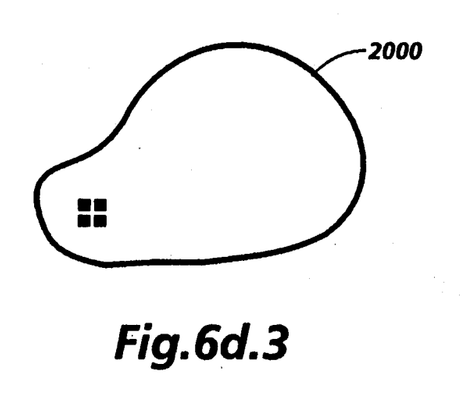
Figure 6D:
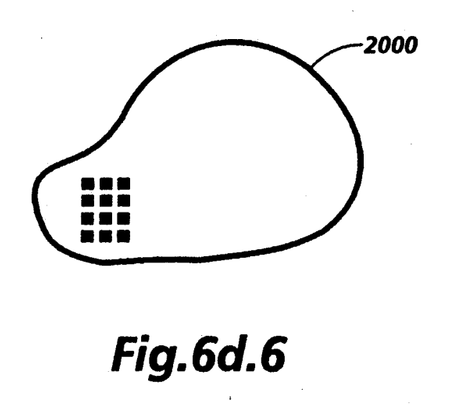
Figure 6D:
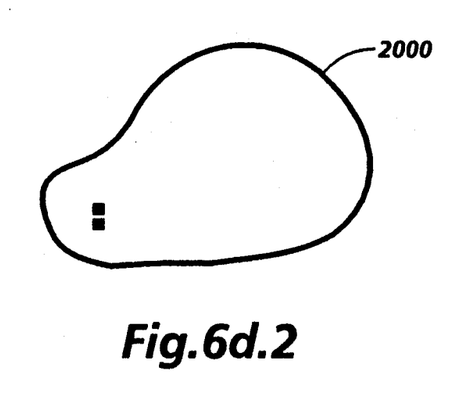
Figure 6D:
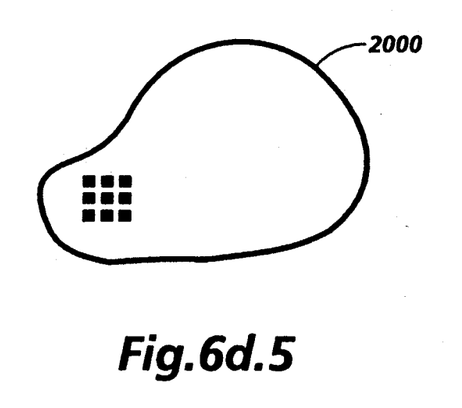
Figure 6D:
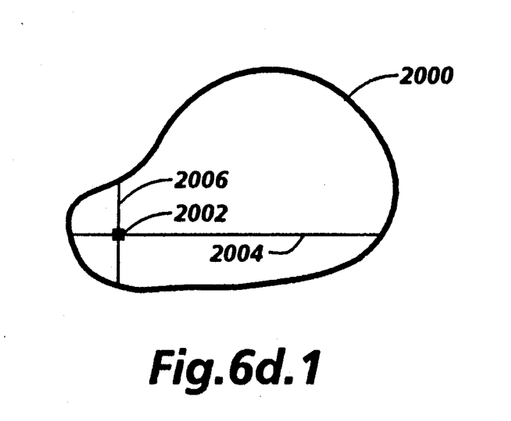
Figure 6D:
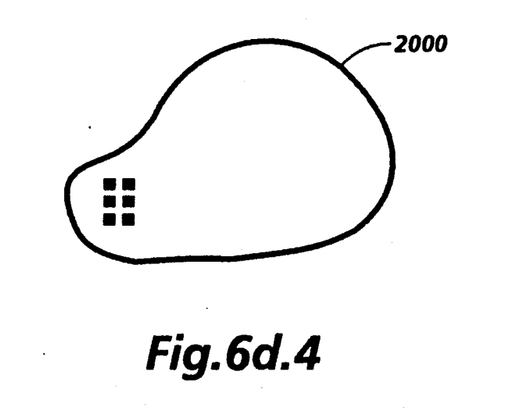
Figure 6D:
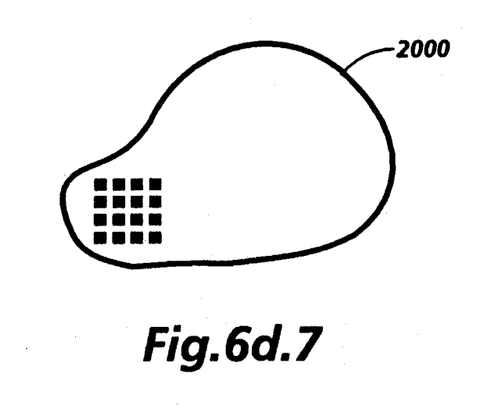
Figure 6D:
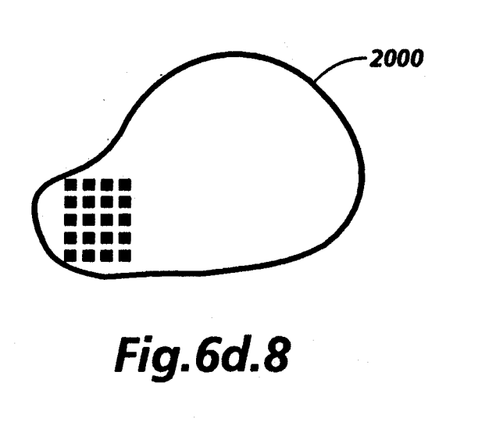
Figure 6D:
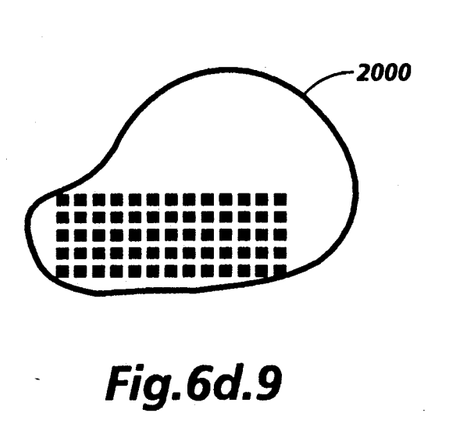
Figure 6D:
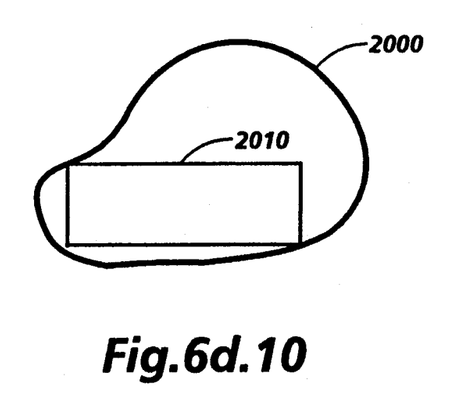
Figure 6E:
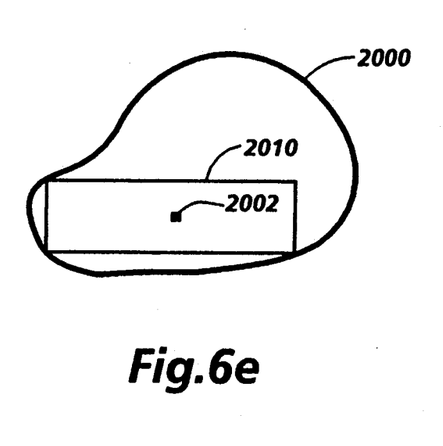
Figure 6F:
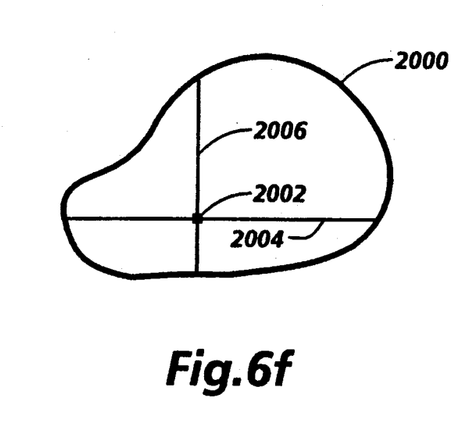
Figure 6G:
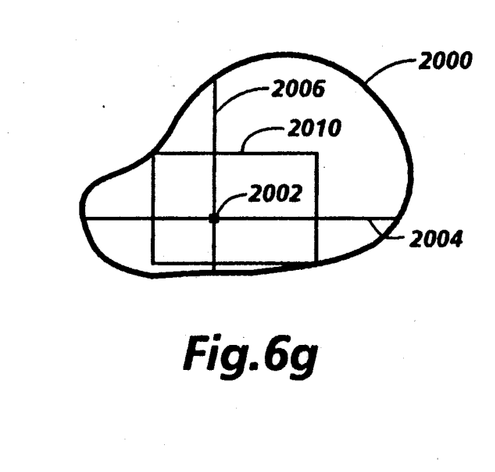
Figure 6H:
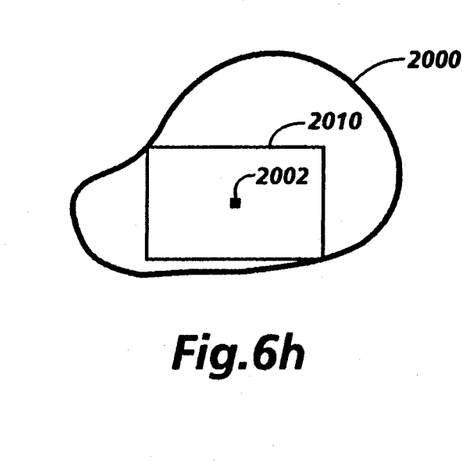
Figure 6I:
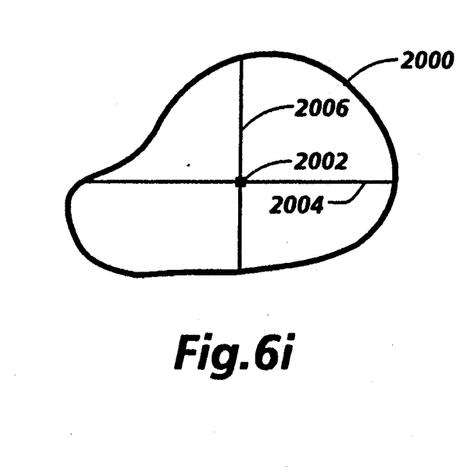
Figure 6J:
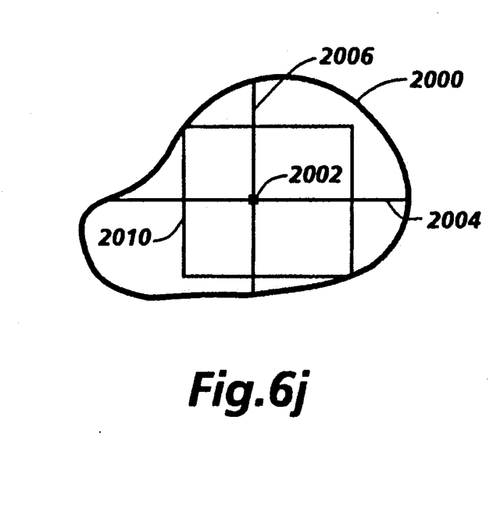
Figure 6K:
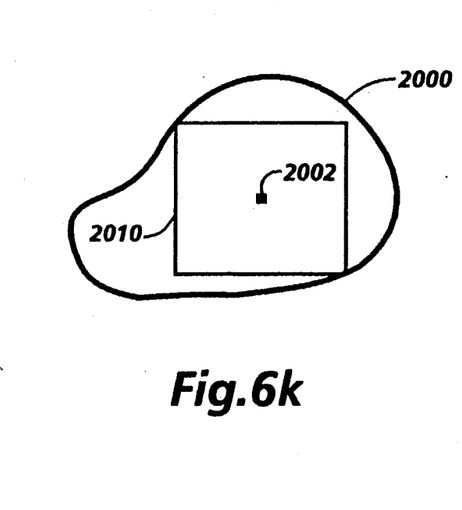
Figure 6L:
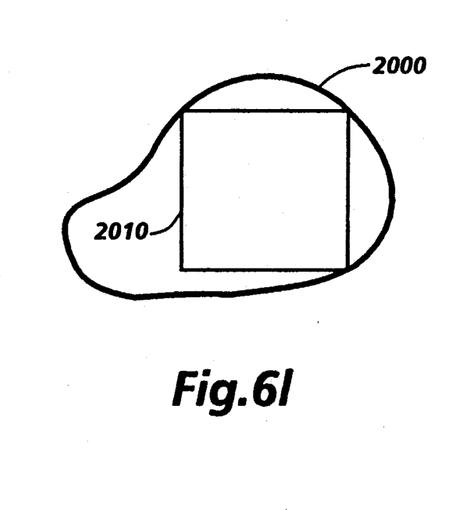
Figures 6M, 6N, 6Q, 6R:
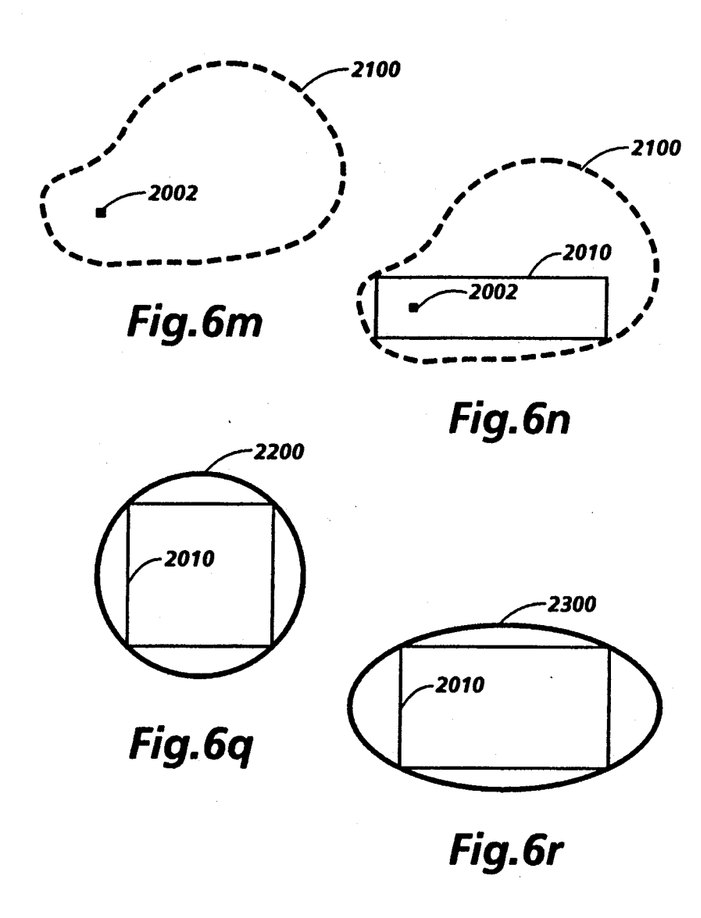
Figures 6O, 6P, 6S, 6T:
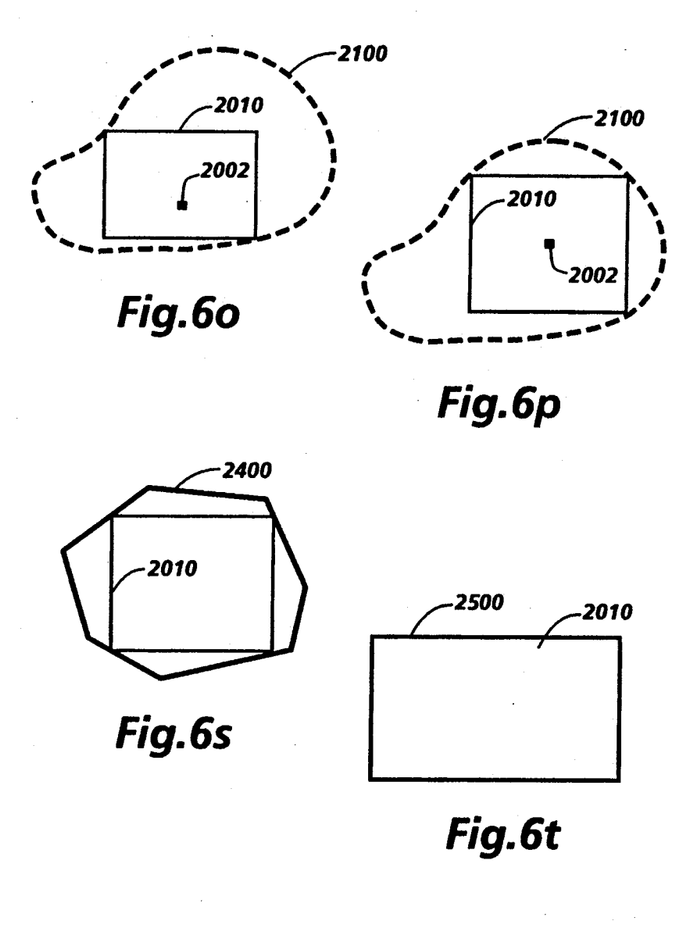

Referring now to FIGS. 6a–6t, illustrated is a method to determine the largest rectangular boundary within an enclosed or semi-enclosed (bounded or semi-bounded) region using a seed point. FIG. 6a shows a bound region 2000 on a bitmap image. Using a pointing device, a user selects a random or seed point 2002 within region 2000 as shown in FIG. 6b. FIG. 6c shows the generation of x-track 2004 and y-track 2006 which intersect at point 2002 and stretch to the boundary of region 2000.

As seen in FIG. 6d, x-track 2004 and y-track 2006 are expanded about point 2002 to form a maximum rectangle 2010. With reference to FIGS. 6d.1–6d.10, it will now be explained how maximum rectangle 2010 is found using original seed point 2002, x-track 2004 and y-track 2006. As shown in FIG. 6d.2, start at the position of the seed point and march one step downward. Next as seen in FIG. 6d.3, move to the left one step. Continuing in a spiral type movement as depicted in FIGS. 6d.4–6d.10 a series of steps are performed which include: update left and right marks and then move upward one step (FIG. 6d.4); update top and bottom marks and then go to the right one step (FIG. 6d.5); move downward (FIG. 6d.6); move to the left (FIG. 6d.7); move upward move to the right; and, stop moving toward downside, left side and upside (FIG. 6d.8). FIG. 6d.9 depicts marching to the right until a black pixel is encountered. Finally, FIG. 6d.10 shows the maximum rectangle 2010 which can be found by moving along the original x-track and y-track determined from the original seed point. Basically this illustrates moving about a point in a spiral motion within a region until no more movement is necessary due to hitting the border of that region.

Returning now to FIG. 6e, the seed point 2002 is now automatically moved to the center of rectangle 2010. Note that the operator only selects the initial seed point within a region and any subsequent new seed points are determined automatically. Next, FIG. 6f depicts finding a new x-track 2004 and y-track 2006 from the new position of point 2002. Again, as shown in FIG. 6g, a maximum rectangle 2010 can be found by moving along x-track 2004 and y-track 2006. As seen in FIGS. 6h–6l, the process is repeated until a maximum rectangle for the entire region is found.

FIGS. 6m–6p illustrate how the maximum rectangle is found using a semi-enclosed area having a dotted line boundary 2100. The steps to find the maximum rectangle with the dotted line region 2100 are the same as described above. Finally, FIGS. 6q, 6r, 6s, and 6t show that a maximum rectangle could be found for a boundary shaped like circle 2200, ellipse 2300, convex polygon 2400, and rectangle 2500 respectively. Although a rectangular boundary is found, it can be appreciated that other boundaries of different shape (e.g. circular) can be determined automatically using a similar process. Furthermore, given an object definition, many types of regions can be found using a similar process.

When designating a coordinate using Template Tool 1190, an operator may select coordinate (x,y) as the corner of a field on the bitmap. But, according to the random model parameters, the coordinate (x+2, y+4) may also represent the same corner of the same field. Therefore, for every coordinate of a field designated by an operator, the random calibration parameters must be applied. The application of the entire range (or distribution) of the random calibration parameters in essence designates several templates for each master, each template being shifted a fixed amount from the original designated by the operator. In other words, given a template having coordinates designated by an operator, by applying the statistical random calibration parameters distribution to that template, the equivalent of several possible templates result all representing the same master. Basically the model defines a fuzzy box around a designated field on a master. The random calibration parameters define how thick the fuzz layer is around the box. Fuzziness is equal to uncertainty so as things are more certain the fuzz become thinner. The fuzz factor used here is more for the clipper than for the recognition. The recognition system uses the system random model parameters to define the uncertainty win the features and attribute. Only one template is stored but the storage of the random distribution give the effect of having many templates stored.

Alignment features are needed because the masters most likely do not have fiducials on it. So, The system will find particular markings on the form and use them as an alignment point (e.g. intersections of lines etc.). Then the system can use a customized set of fiducials for a particular form in order to so lets go find them and warp the document into alignment. Therefore, during the recognition process, a form to be recognized can be within the statistical error of the template and still be recognized as being of the same form type as the master.

Referring back to FIG. 4, Bitmap 1192 is passed from Template Tool 1190 to Alignment Feature Processing Block 1210. It is within Alignment Feature Processing Block 1210 that corrections are made to the operator designated template to account for the random calibration parameters discussed above.

Template Tool 1190 stores the operator defined Template 1196 with associated random calibration parameters, and Template Form Identification 1198 in Template Store 1260. Template Feature Processing Block 1210 stores Alignment Parameters 1212 in Template Store 1260. Alignment Parameters 1212 are the distribution of error ranges that are acceptable for that template derived from the random calibration parameters. Thus, for each template stored in Template Store 1260, there is stored a "best case" template plus the distribution of acceptable error ranges which can be applied to that template. An alternate method would be to apply the random calibration parameters to the ideal template before storage into the Template Store thus storing several templates for each master.

Often before a master form is created, the creator of the master form knows what types of fields are needed on the form and in some cases, what information will be supplied in those fields once the form is used. For instance, if a form needs a field indicating the sex of the person using the form, the creator of the form can expect that the key words "male" or "female" will be indicated in that field. A Computer Database 1180 is often set up having a storage area readily available for storing the information from each field of a form and containing information as to what type of data to expect. As will be seen in the run-time recognition operation of system 10, information from the fields of forms are extracted and stored in database 1180. Lexicon Tool 1200 uses the information stored in Database 1180 prior to data extraction to make intelligent use of bitmap 1192. Lexicon Tool 1200 is set up to search bitmap 1192 for fields using key words which the database anticipates will be used on a completed form. These key words are stored in Lexicon Store 1240 and can later be used by the postprocessing functions of the recognition system.

Recognition Specific Processing Block 1220 uses bitmap 1194 to determine useful information to be stored along with the template. For example, if a field on the template is designated for Check Box Recognition, Block 1220 can determine how many bits within that field are set in the master. With that information, the check box recognition system has only to count how many bits are set in the field from the incoming form, and subtract how many were set in the master to make a determination if a box in that field has been set. Another example would be to alert an OCR preprocessor if a field destined for OCR processing has a colored background. A final example would be the prior knowledge of the type of data which is going into a field (e.g. a phone number). Many other recognition specific processing functions can be envisioned thus, Block 1220 is not meant to be limited to the ones described as examples herein.

A detailed description of the remaining elements of the forms recognition system which have not been discussed in detail above can be found in cross-referenced application titled "Forms Recognition and Processing System."

While the invention has been described with reference to the structures disclosed, it is not confined to the details set forth, but is intended to cover such modifications or changes as may come within the scope of the following claims.

We claim:

1. A method for assisting creation of an electronic template in a forms recognition system, said forms recognition system having a graphical display and a pointing device, including the steps of:
   a) scanning a master form having plural regions indicating fields wherein said fields are devoid of data, said scanning creating a master bitmap;
   b) displaying said master bitmap on said graphical display;
   c) selecting a single point within a first region with said pointing device;
   d) expanding automatically about said single point to determine coordinates of a second region which approximates said first region;
   e) storing said coordinates of said second region, said coordinates to be used in assisting creation of said electronic template; and
   f) repeating steps c through e for each of said plural regions on said master form.

2. A method according to claim 1 further including the step of selecting an object definition prior to expanding about said single point.

3. A method according to claim 1 wherein said first region is bounded.

4. A method according to claim 3 wherein said first region which is bounded is also rectangular.

5. A method according to claim 3 wherein said first region which is bounded is also circular.

6. A method according to claim 3 wherein said first region which is bounded is also elliptical.

7. A method for assisting creation of an electronic template in a forms recognition system, said forms recognition system having a graphical display and a pointing device, including the steps of:
   a) scanning a master form having plural regions indicating fields wherein said fields are devoid of data, said scanning creating a master bitmap;
   b) displaying said master bitmap on said graphical display;
   c) selecting a single point within a first region with said pointing device;
   d) expanding automatically about said single point to determine a rectangle within said first region about said point;
   e) moving said single point automatically to the center of said rectangle;
   f) repeating steps d and e until coordinates of a second region which approximates said first region are found, wherein said second region is a maximum rectangular approximation of said first region;
   g) storing said coordinates of said second region, said coordinates to be used in assisting creation of said electronic template; and
   h) repeating steps c through g for each of said plural regions on said master.

8. A method according to claim 7 further including the step of selecting an object definition prior to expanding about said single point.

9. A method according to claim 7 wherein said first region is bounded.

10. A method according to claim 9 wherein said first region which is bounded is also rectangular.

11. A method according to claim 9 wherein said first region which is bounded is also circular.

12. A method according to claim 9 wherein said first region which is bounded is also elliptical.

13. A method for assisting creation of an electronic template in a forms recognition system, said forms recognition system having a graphical display and a pointing device, including the steps of:

a) scanning a master from having plural regions indicating fields wherein said fields are devoid of data, said scanning creating a master bitmap;

b) displaying said master bitmap on said graphical display;

c) selecting a single point within a first irregular region with said pointing device;

d) expanding automatically about said single point to determine a first regular region within said first irregular region about said point;

e) moving said single point automatically to the center of said first regular region;

f) repeating steps d and e until coordinates of a maximum regular region within said first irregular region are found;

g) storing said coordinates of said maximum regular region within said first irregular region, said coordinates to be used in assisting creation of said electronic template; and h) repeating steps c through g for each of said plural regions on said master.

14. A method according to claim 13 further including the step of selecting an object definition prior to expanding about said single point.

15. A method according to claim 13 wherein said first irregular region is bounded.

16. A method according to claim 15 wherein said maximum regular region is rectangular.

17. A method according to claim 15 wherein said maximum regular region is circular.

18. A method according to claim 15 wherein said maximum regular region is elliptical.

* * * * *